INVENTOR.
Joseph H. Dew

INVENTOR.
Joseph H. Dew
BY
C.R. Meland
His Attorney

United States Patent Office 3,105,479
Patented Oct. 1, 1963

3,105,479
IGNITION SPARK TIMING CONTROL
Joseph H. Dew, Flint, Mich., assignor to General Motors Corporation, Detroit, Mich., a corporation of Delaware
Filed Dec. 4, 1961, Ser. No. 156,905
12 Claims. (Cl. 123—146.5)

This invention relates to a system for controlling the spark timing of an internal combustion engine and more particularly to a system for controlling the spark advance of the engine distributor in response to changes of speed of the engine.

The amount of acceleration and deceleration of an internal combustion engine depends upon various factors, including, the supply of fuel, gravity, braking and other frictional forces. This acceleration and deceleration also depends on spark setting at a given engine speed and the present invention is directed to a system for automatically adjusting the spark setting of the engine to its optimum value under various conditions of operation.

It accordingly is one of the objects of this invention to provide an ignition timing system for an internal combustion engine wherein changes in speed due to improper spark setting are sensed and the spark setting adjusted to its optimum value in accordance with the information sensed.

Another object of this invention is to provide an ignition system for an internal combustion engine wherein means are provided for constantly varying spark setting together with means for sensing the effect of this variation of spark setting on the engine and for adjusting the spark setting to an optimum condition in accordance with the conditions sensed. In carrying forward this object of the invention, the breaker plate of the distributor is oscillated and this oscillation will cause the engine to accelerate or decelerate. This condition of acceleration or deceleration is sensed and the spark setting is then changed or shifted towards its optimum value.

A further object of this invention is to provide a spark advance arrangement for an engine wherein a rotatable part of the engine distributor that controls spark setting is oscillated over a narrow angle, and further wherein ratchet means are provided under the control of changes in engine speed due to variation of the spark setting for causing the rotatable member to be moved toward an optimum spark setting.

Further objects and advantages of the present invention will be apparent from the following description, reference being had to the accompanying drawings wherein preferred embodiments of the present invention are clearly shown.

Figure 1:
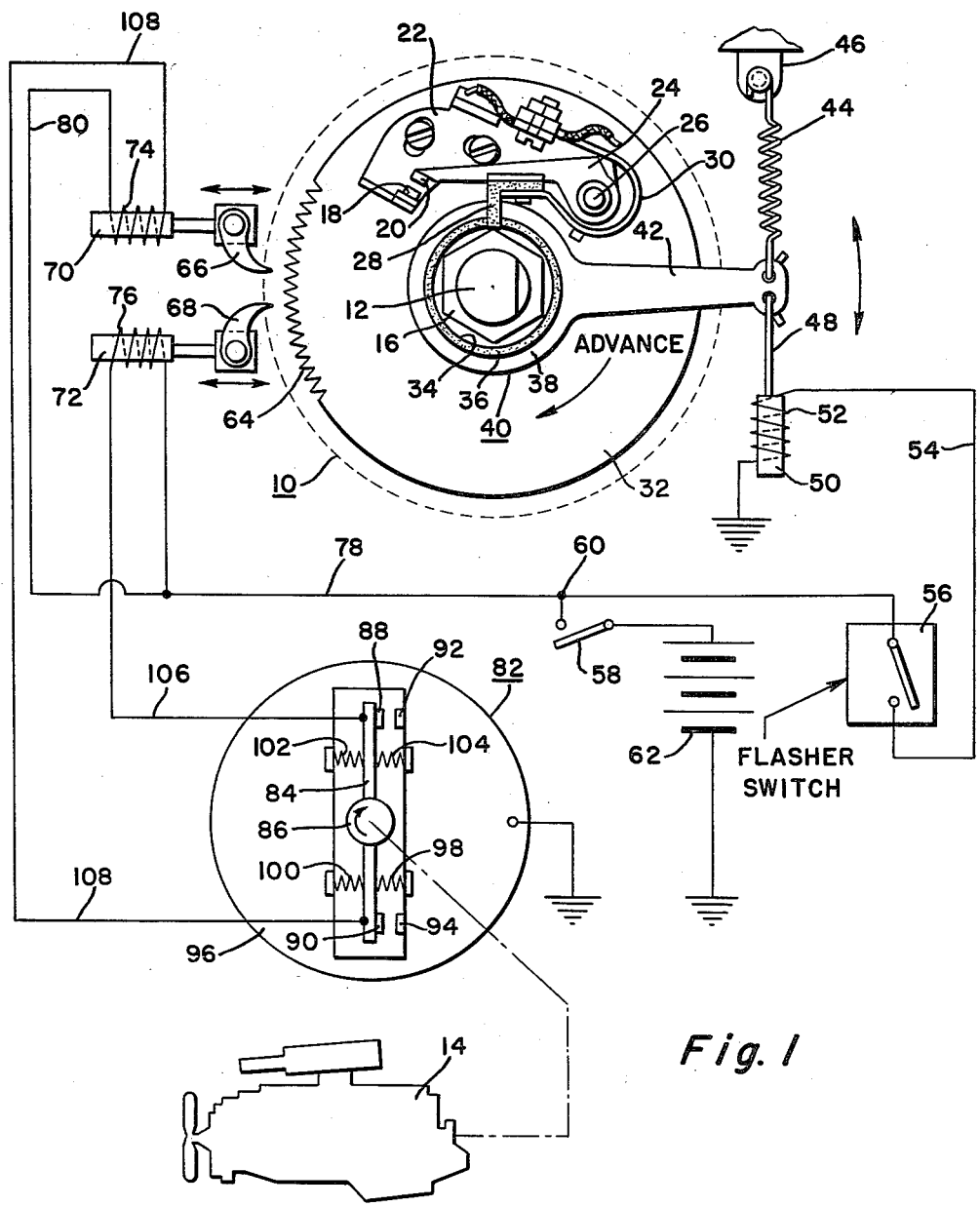
FIGURE 1 is a schematic illustration of an ignition timing control system made in accordance with this invention.

Referring now to the drawings and more particularly to FIGURE 1, the reference numeral 10 designates a distributor for controlling the spark timing of an internal combustion engine. This distributor has the usual shaft 12 which is driven by the internal combustion engine 14. The shaft carrying a conventional cam 16. The cam 16 operates the breaker contacts of the distributor which have been designated by reference numerals 18 and 20. It is seen that the breaker contact 18 is supported by plate member 22 and that breaker contact 20 is carried by a breaker lever 24 which is pivoted to the post 26. The breaker lever 24 has a rubbing block 28 which engages the cam 16 and serves to open the breaker contacts during its rotation. The breaker contacts are normally urged to a closed position by the spring 30.

The plate member 22 is carried by a rotatable spark adjusting member 32 and rotation of the member 32 adjusts the rubbing block relative to the breaker cam 16 to control the spark timing for the internal combustion engine 14. Clockwise rotation of the timing plate 32 causes an advance in spark timing whereas counterblockwise rotation of the plate 32 causes the spark to be retarded. The electric circuit for supplying spark impulses to the engine 14 under the control of the opening and closing of breaker contacts 18 and 20 has not been illustrated, it being understood that it is conventional with the breaker points controlling the current flow between a battery and the primary winding of the ignition coil. The distributor 10 may also include the usual rotor and distributor cap for supplying spark impulses to the spark plugs of the engine 14 all of which is well known to those skilled in the art.

The breaker plate or rotatable member 32 has a flange 34 that engages one side of a ring of friction material 36. This friction material also engages the annular portion 38 of an actuating member generally designated by reference numeral 40. The member 40 has an arm 42 formed integral with the annular portion 38 and it will be apparent that as the member 40 is rotated, the member 32 will likewise rotate through engagement with the friction material 36. The fit between the friction material, the flange 34 and the annular member 38 is such that if a force is applied to one of the members to stop its rotation, the other will rotate with respect thereto by slippage on the friction material.

The arm member 42 has one end thereof connected with a spring 44 which is secured to the fixed member 46. The arm member 42 is also connected with a rod 48 which is shifted by the armature 50 of an electromagnetic actuator that includes the coil winding 52. The coil winding 52 has one side thereof connected with lead wire 54 and it is seen that this lead wire is connected to one side of a rapidly cycling flasher switch 56 which opens and closes at a rapid rate when energized. The flasher switch should be designed so that its closing time is greater than the time that it is open so that coil 52 is energized for a longer period than it is deenergized during one cycle of operation of the switch 56. The switch may cycle, for example 60 times per minute and it is apparent to those skilled in the art that this switch could be of a type other than a thermal switch as long as its closing time is of longer duration than its open time.

The opposite side of the flasher switch 56 is connected to junction 60. The junction 60 is connected to one side of a battery 62 through ignition switch 58. The opposite side of the battery is connected directly to ground.

It will be apparent that when the switch 58 is closed, the flasher switch is energized to periodically open and close and therefore periodically energize the coil winding 52 at a rapid rate. As noted above, the coil winding 52 will be energized for a longer period than when it is deenergized over one cycle of operation of the switch 56. When the coil winding 52 is energized, the arm 42 will be shifted clockwise to advance the spark setting and when the coil winding is deenergized, the spring 44 will pull the arm 42 counterclockwise. In this manner, the arm 42 will be oscillated over a narrow angle from its position shown on the drawing to a position which is clockwise of the position shown on the drawing.

The rotatable timing plate 32 is formed with a plurality of ratchet teeth 64 formed along its circumference. The spacing between the ratchet teeth may be, for example, .25°. These ratchet teeth cooperate with the pawls 66 and 68 which are operated respectively by the armatures 70 and 72 of solenoids which include the coil windings 74 and 76. It can be seen that one side of the coil winding 76 is connected to one side of the battery 62 via the lead wire 78 and the junction 60. One side of the coil winding 74 is likewise connected to one side of the battery 62 via the lead wire 80.

The spark advance system of this invention includes a sensing device which is generally designated by reference numeral 82. This sensing device comprises a switch actuator 84 which is driven by a shaft 86. The switch actuator 84 has contacts 88 and 90 which cooperate with contacts 92 and 94 carried by a flywheel 96. The flywheel 96 is connected to the switch actuator 84 by the springs 98, 100, 102 and 104. The shaft 86 is driven by the engine 14 as is clearly apparent from FIGURE 1. The contacts 92 and 94 are connected directly to ground as through the flywheel or through any other conventional arrangement.

It will be apparent that when the engine 14 is accelerating and the shaft 86 rotating in the direction indicated by the arrow, the contacts 88 and 92 will close. On the other hand, when the engine 14 is decelerating, the contacts 90 and 94 close and the contacts 88 and 92 remain open. When there is no acceleration or deceleration, both pairs of contacts 88 and 92 and 90 and 94 remain in an open position.

It can be seen that the contact actuator 84 is connected to one side of the solenoid coil winding 76 via lead wire 106 and is also connected to one side of coil winding 74 via the lead wire 108. It will, of course, be appreciated that contacts 88 and 90 may be insulated from each other and that lead wire 106 could be connected directly with contact 88 with the lead wire 108 being directly connected with contact 90. One end of the springs connected between the contact actuator 84 and the flywheel 96 are insulated so that there is no electrical connection between the contact actuator 84 and ground except when the contacts 88 and 92 or 90 and 94 are in engagement.

In operation of the ignition timing control apparatus of this invention, the manually operable switch 58 is closed when it is desired to run the engine. When switch 58 is closed, the switch 56 opens and closes to cause the arm 42 to be oscillated through a small angle. When the coil winding 52 is energized, the arm 42 will be moved in a clockwise direction and carries the plate member 32 with it so that the plate member is moved in a clockwise direction. This movement of the plate member 32 will cause an advance in spark setting. This advance in spark setting will move the plate 32 either towards or away from its optimum spark setting for a given engine speed. If this movement is toward the optimum spark setting, the engine will be accelerated whereas if this movement is away from the optimum spark setting, the engine will decelerate.

If it is assumed that the clockwise movement of arm 42 has advanced the plate 32 towards its optimum setting, the engine accelerates. When the engine accelerates, the contacts 88 and 92 will close and the coil winding 76 will be energized to force the pawl member 68 into engagement with the ratchet teeth 64. The pawl member 68 and the ratchet teeth 64 are designed to provide ratcheting when the rotatable member 32 is moving clockwise but to prevent movement of the rotatable member 32 if it is urged in a counterclockwise direction. It thus can be seen that when the arm 42 moves in a clockwise direction, it will carry the member 32 with it and the pawl member 68 will ratchet over the ratchet teeth 64. As the coil winding 52 becomes deenergized, the pawl member 68 prevents the member 32 from following the movement of the arm 42 in a counterclockwise direction due to slippage on the friction material 36. It thus is seen that if the plate 32 is shifted clockwise and causes an acceleration of the engine due to the forced change in spark setting, the pawl 68 will be projected to cause a slight adjustment of the timing plate 32 in the clockwise direction and therefore towards optimum spark setting.

If a clockwise movement of the timing plate 32 causes a deceleration of the engine, it indicates that the timing plate is being moved away from its optimum spark setting position. Assuming that the timing plate is moving away from its optimum spark setting for a given speed, the engine is then decelerated and the contacts 90 and 94 will close. This causes the solenoid coil winding 74 to be energized and causes the pawl 66 to be moved into engagement with the ratchet teeth 64. The pawl 66 and the ratchet teeth 64 are so arranged that during counterclockwise movement of plate 32, the pawl 66 ratchets over the teeth 64. During clockwise movement of the plate 32, the pawl 66 will become engaged with one of the teeth 64 to prevent further clockwise rotation of the plate 32. It thus is seen that during deceleration when the contacts 90 and 94 are closed, the pawl 66 will stop clockwise movement of the plate 32 and the arm 42 and therefore shift relative to the plate 32. When solenoid coil winding 52 then becomes deenergized, the arm 42 and the plate 32 will move counterclockwise together thus shifting the plate a slight amount in a direction to retard the spark which now is in a direction towards the optimum spark setting for the operating conditions of the engine.

It can be seen from the foregoing that the plate 32 is intentionally advanced and the results of this advance on engine operation is sensed and a connection then made to shift the plate towards its optimum spark setting. Thus, if an acceleration of the engine occurs upon an advance of the plate 32, it indicates that the plate is moving towards its optimum spark setting and the sensing device 82 therefore causes the plate to be shifted clockwise toward its optimum spark setting. On the other hand, if an advance of the plate 32 causes the engine to decelerate, this condition is sensed by the sensing device 82 and is translated into a retarding movement or counterclockwise movement of the plate 32.

In the system of FIGURE 1, the timing plate 32 has its adjustment controlled solely by reciprocations of arm 42. The device illustrated in FIGURE 1 is fully capable of controlling spark timing but it will be apparent to those skilled in the art that it also could be used as a fine adjustment control for distributors that have the conventional vacuum and centrifugal advance controls. If desired, a stop may be provided to limit the range of spark advance to that which the engine requires.

Figure 2:
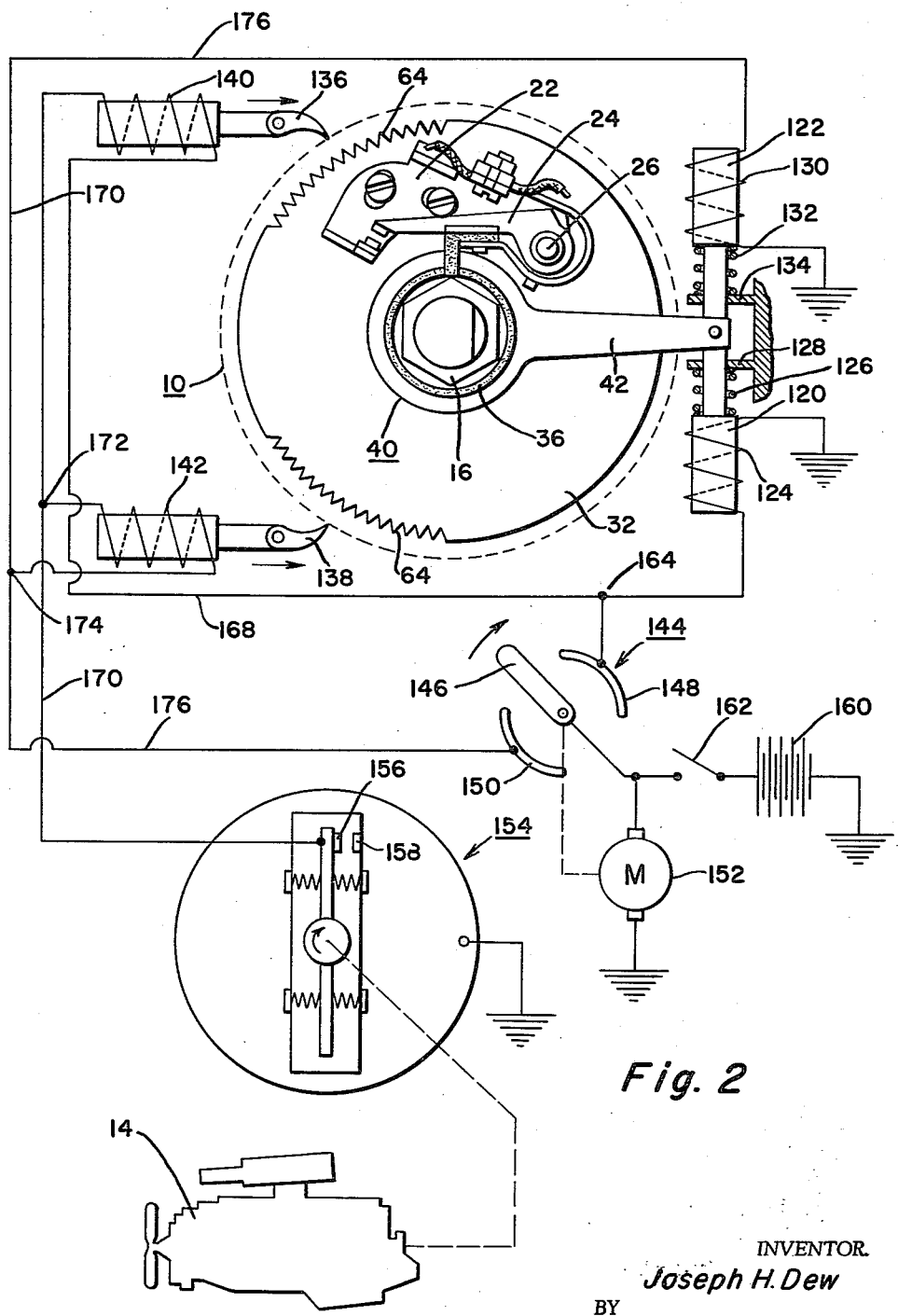
FIGURE 2 is a schematic illustration of a modified ignition control system made in accordance with this invention.

Referring now more particularly to FIGURE 2, a modified ignition timing control system is illustrated which is similar in many respects to that of FIGURE 1. The FIGURE 2 system is simpler than the one illustrated in FIGURE 1 and is immune to shifting of the breaker plate or timing plate in response to gravity, supply of fuel, braking or other frictional causes. It is sensitive to acceleration caused by a change in spark setting. In FIGURE 2, the same reference numerals have been used as were used in FIGURE 1 to identify corresponding parts in each figure.

In FIGURE 2, the arm 42 is connected with armatures 120 and 122. The armature 120 and the coil winding 124 form part of a solenoid actuator which when energized moves the arm 42 in a clockwise direction. A compression spring 126 is positioned between the armature 120 and a fixed abutment 128 to shift the arm 42 to a neutral position when the solenoid coil winding 124 is deenergized. In a similar fashion, the armature 122 and coil winding 130 form a solenoid actuator for moving the arm 42 in a counterclockwise direction. A compression spring 132 is positioned between the armature 122 and a fixed abutment 134. It can be seen that when neither coil winding 130 nor coil winding 124 is energized, the springs 126 and 132 move the arm 42 to a neutral position. Energization of coil winding 130 shifts the arm 42 in a counterclockwise direction to retard the spark whereas energization of coil winding 124 shifts the arm 42 in a clockwise direction to advance the spark.

The timing plate 32 once more has ratchet teeth 64 which cooperate respectively with pawls 136 and 138.

The pawl 136 can be projected into engagement with the ratchet teeth 64 by a solenoid actuator which includes the coil winding 140. In a similar fashion, the pawl 138 can be shifted into engagement with the ratchet teeth 64 by the solenoid actuator which includes coil winding 142. When the pawl 136 is shifted into engagement with the ratchet teeth 64 it moves the plate 32 in a clockwise direction. When pawl 138 is shifted into engagement with ratchet teeth 64 it moves the timing plate in a counterclockwise direction.

The system of FIGURE 2 includes a rotary switch which is generally designated by reference numeral 144. This rotary switch includes a rotatable contactor 146 which engages conducting segments 148 and 150 as the contactor 146 rotates. The contactor 146 is driven at constant speed by any suitable means such as a constant speed electric motor 152.

The sensing device for the FIGURE 2 system is generally designated by reference numeral 154. This sensing device is identical to the sensing device 82 of FIGURE 1 with the exception that only one pair of contacts 156 and 158 are used and the device will thus sense only acceleration of the engine. When the engine is accelerating, the contacts 156 and 158 will be closed while at other conditions of operation of the engine, the contacts 156 and 158 are open. It will be appreciated by those skilled in the art that the sensing device 154 might take other forms as long as it will sense an acceleration of the engine 14.

The system of FIGURE 2 is powered by a battery 160, one side of which is grounded and the opposite side of which is connected with a manually operable switch 162. The opposite side of switch 162 is electrically connected with the rotatable contactor 146 and is electrically connected wtih the motor 152 which drives the contactor 146.

The conducting segment 148 is electrically connected with a junction 164 which in turn is connected with solenoid coil winding 124 via lead wire 166. The opposite side of the coil winding 124 is grounded as shown. The junction 164 is connected to one side of solenoid coil winding 140 via lead wire 168. The opposite side of solenoid coil winding 140 is connected with a lead wire 170. The lead wire 170 is connected with junction 172 and with the contact 156 of the sensing device 154.

One side of the coil winding 142 is connected with junction 172 whereas the opposite side of coil winding 142 is connected with junction 174. The junction 174 is connected with lead wire 176 which extends between the conducting segment 150 and one side of the solenoid coil winding 130. The opposite side of the solenoid coil winding is grounded as shown.

In operation of the system shown in FIGURE 2, the ignition switch 162 is closed to energize the motor 152 and cause the contactor 146 to rotate. When the contactor 146 engages the conducting segment 148, the solenoid coil winding 124 is energized to shift the arm 42 in a clockwise direction. The arm 42 will carry the breaker plate 32 with it in a clockwise direction. When breaker plate 32 moves in a clockwise direction, it will advance the spark setting which will cause the engine either to accelerate or decelerate. If the timing plate is being moved towards its optimum spark setting, the engine will accelerate but if the timing plate is being moved away from its optimum spark setting, the engine will decelerate. Assuming that the plate 32 is being moved towards its optimum spark setting, the engine accelerates and causes the contacts 156 and 158 to close. The solenoid coil winding 140 will now be energized when the contactor 146 passes over the conducting segment 148 through a circuit that can be traced from junction 164, lead wire 168, coil winding 140, lead wire 170, and through contacts 156 and 158 to ground. When coil winding 140 is energized, the pawl 136 is projected into engagement with the ratchet teeth 64 and it pushes the timing 32 a slight distance clockwise with respect to the arm 42 to therefore advance the spark and move it toward its optimum spark setting position. When the conducting contactor 146 leaves the conducting segment 148, both solenoid coil windings 124 and 140 are deenergized. The pawl 136 then ratchets over the teeth 64 and the spring 126 returns the arm 42 to a neutral position. The plate 32 now has been adjusted some small amount in the clockwise direction towards optimum spark setting.

As the contatcor 146 now rides over the conducting segment 150, solenoid coil winding 130 is energized. This causes the arm 42 and the timing plate 32 to be rotated in a counterclockwise direction and in a direction to retard the spark. If it is assumed that previous movement of the timing plate 32 moved it towards its optimum spark setting, it is apparent that the now retarding movement of the timing plate 32 will move it away from its optimum spark setting. This will cause a deceleration of the engine and the contacts 156 and 158 will therefore remain open and will not permit either coil winding 140 or 142 to be energized. As a result, the timing plate 32 will not be adjusted in a counterclockwise direction since this would be moving it farther away from its optimum setting.

As the contactor 146 now once more engages the conducting segment 148, the arm 42 is again moved in the clockwise or advance direction. Since we have assumed that this direction of movement is toward the optimum spark setting, the engine is once more accelerated and the contacts 156 and 158 are closed. This causes another slight movement of the contact plate 32 in the clockwise or advance direction. After a certain number of revolutions of contact 146, the plate 32 will be adjusted to its optimum spark setting and further movement of the plate 32 through a narrow angle will then not cause either an acceleration or deceleration of the engine. When this point is reached, the contacts 156 and 158 are never closed and the timing plate 32 is therefore not adjusted in either direction.

It is apparent that as the timing plate 32 is being moved or oscillated between advance or retard positions, it is possible that an acceleration of the engine will occur when the timing plate 32 is moved counterclockwise. This will occur when a retarding movement of the timing plate 32 is actually moving the breaker plate toward rather than away from its optimum spark setting. In such a situation, the engine will be accelerated to cause the contacts 156 and 158 to close and therefore cause a slight movement of the timing plate 32 in a counterclockwise direction by the projecting of the pawl 138. The pawl 138 like pawl 136 will shift the timing plate 32 in a counterclockwise direction with respect to arm 42 by slippage in the friction material 36. Where counterclockwise movement of the timing plate 32 causes an acceleration of the engine, it is obvious that clockwise movement will cause a deceleration and therefore the plate member 32 in this situation is not adjusted clockwise since the pawl 136 is never projected.

It can be seen from the foregoing, that the system of FIGURE 2 operates to adjust the spark timing towards its optimum spark setting. The continued oscillation of the timing plate 32 through a narrow angle causes the engine either to accelerate or decelerate and this acceleration is sensed by the sensing device 154. The sensing device 154 then controls solenoids 140 and 142 to cause a correct adjustment of the timing plate 132. In this arrangement like the arrangement of FIGURE 1, the spark timing is initially varied and the effect of this variation is then sensed with a correction being made as a result of the information sensed.

The system of FIGURE 2 is not sensitive to accelerations caused by gravity, supply of fuel, braking, or other frictional causes. Thus, during a continued acceleration, solenoids 140 and 142 and solenoid coil windings 130 and 124 are intermittently energized equally to cause the timing plate 32 to merely move back and forth over a narrow angle with the timing plate never being progressively adjusted in one direction or the other. The system thus is sensitive to changes in spark setting rather than to changes caused by the other factors mentioned above.

When no acceleration occurs from either clockwise or counterclockwise movement of the timing plate 32, it indicates that the timing plate is in its optimum spark setting position and therefore neither coil winding 140 nor coil winding 142 are energized to cause any adjustment of the timing plate 32.

While the embodiments of the present invention as herein disclosed, constitute preferred forms, it is to be understood that other forms might be adopted.

What is claimed is as follows:

1. In combination, an internal combustion engine, a distributor for controlling the spark timing of said engine, said distributor including a shiftable part for varying the spark setting of said engine, means for oscillating said shiftable part continuously to advance and retard the spark setting, sensing means for sensing changes in speed of said engine due to shifting of said shiftable part, and means for causing said shiftable part to be adjusted in one direction or the other in response to conditions sensed by said sensing means.

2. In combination, an internal combustion engine, means for continuously varying the spark timing of said engine, sensing means for sensing changes of speed of said engine caused by varying the spark timing of said engine, and means for adjusting the spark timing of said engine towards an optimum position in accordance with the conditions sensed by said sensing means.

3. In combination, an internal combustion engine, a distributor for controlling the spark timing of said engine, said distributor including a shiftable part for varying the spark setting of said engine, reciprocating means for oscillating said shiftable part, and means including said reciprocating means for causing said shiftable part to move in opposite directions in response to acceleration and deceleration of said engine caused by varying said spark setting.

4. In combination, an engine provided with a distributor, said distributor including shiftable means for varying the spark setting of the engine, reciprocating means for moving said shiftable means over a predetermined distance, and means including said reciprocating means for causing said shiftable means to be shifted in response to acceleration and deceleration of said engine.

5. In combination, an internal combustion engine, a distributor for controlling the spark setting of said engine having a shiftable device for varying said setting, a reciprocating member, friction clutch means connecting said reciprocating member and said shiftable device, and means for preventing movement of said shiftable device in one direction under the impetus of said reciprocating member in response to changes in speed of said engine.

6. In combination, an internal combustion engine, a distributor having a rotatable part that is adapted to control the spark setting for said engine, an arm member, friction clutch means connected between said arm member and said rotatable part, reciprocating means for oscillating said arm member, and means for preventing movement of said rotatable part in one direction in accordance with changes in speed in said engine.

7. In combination, an internal combustion engine, a distributor having a rotatable part for controlling the spark setting of said engine, an arm member, means connecting said arm member and said rotatable part whereby said arm member and part may move together or may shift relative to one another when a braking force is applied to said rotatable part, means for reciprocating said arm member, and means for causing a braking of said rotatable part in accordance with changes in speed of said engine.

8. In combination, an internal combustion engine, a distributor for controlling the spark setting of said engine including a rotatable part which is shiftable to vary the spark setting for said engine, an arm member, means connecting said arm member and said rotatable part whereby said arm member and rotatable part may be shifted together and may have relative movement when rotation of said rotatable part is stopped, means for reciprocating said arm member, ratchet means for stopping rotation of said rotatable part in one direction of movement, and means for controlling said ratchet means in accordance with changes of speed of said engine.

9. In combination, an internal combustion engine, a distributor including a rotatable breaker plate for controlling the spark setting of said engine, breaker contacts carried by said breaker plate, a shaft driven by said engine for controlling the opening and closing of said breaker contacts, power means separate from said engine for imparting motion to said rotatable breaker plate, and means operting in response to changes in speed of said engine and cooperating with said power means for controlling movement of said breaker plate.

10. In combination, an internal combustion engine, a distributor including a rotatable cam that is driven by said engine and including a rotatable breaker plate for varying the spark setting for said engine, an arm member, frictional material connecting said arm member and said breaker plate whereby said arm member and breaker plate rotate together under certain conditions of operation and rotate relative to each other when a braking force is applied to said breaker plate, reciprocating means for oscillating said arm member, ratchet means including a pair of pawl members engaging ratchet teeth formed on said rotatable breaker plate, first and second solenoids for controlling the movement of said pawl members, and switch means operating in response to acceleration and deceleration of said engine for controlling the energization of said first and second solenoids.

11. In combination, an internal combustion engine, means for continuously varying the spark timing of said engine, sensing means operably connected with said engine for sensing an increase or a decrease in the speed of said engine caused by continuously varying its spark timing, and means for adjusting the spark timing of said engine towards an optimum position in accordance with the conditions sensed by said sensing means.

12. A method of operating an internal combustion engine, the steps comprising, increasing or decreasing the speed of said engine by continuously varying the spark timing of the engine, sensing the change in speed of said engine due to the varying of its spark timing and then adjusting the spark timing toward its optimum spark setting in accordance with the condition sensed.

No references cited.